Figure 1:
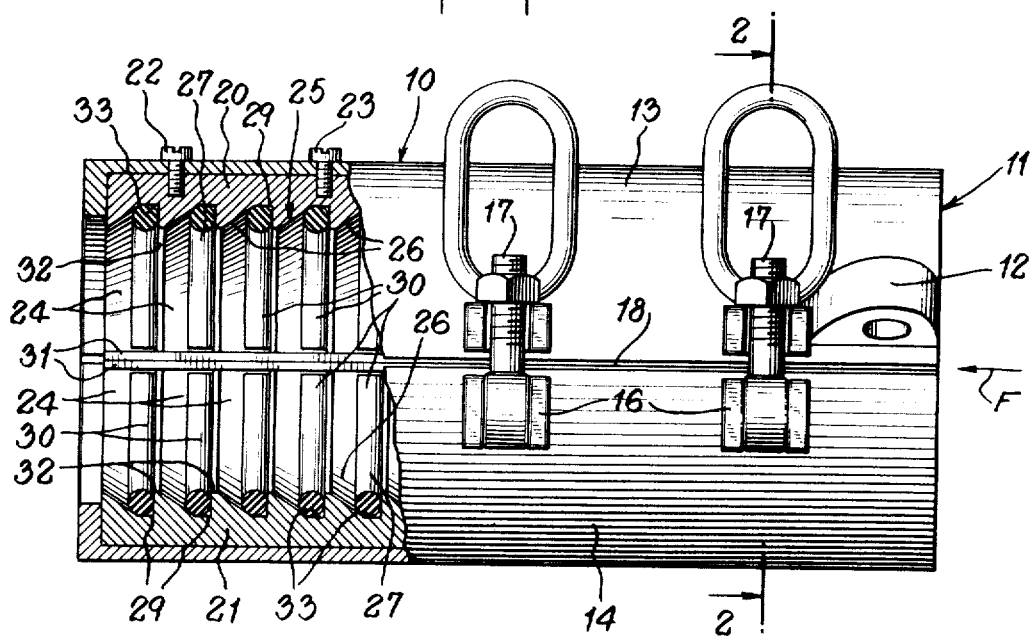

United States Patent
Oriani

[15] 3,672,613
[45] June 27, 1972

[54] DISTRIBUTING CLAMPING STRESS DEVICE FOR CABLE LAYING

[72] Inventor: Agostino Oriani, Sesto San Giovanni, Italy

[73] Assignee: Industrie Pirelli S.p.A., Milan, Italy

[22] Filed: March 27, 1970

[21] Appl. No.: 23,297

[30] Foreign Application Priority Data

July 10, 1969    Italy.................................19410 A/69

[52] U.S. Cl...........................248/62, 24/249 PC, 24/125 K, 24/285, 24/262, 285/373
[51] Int. Cl............................................................F16l 3/10
[58] Field of Search............248/62; 24/249, 249 PC, 263 RB; 285/373, 113, 419

[56] References Cited

UNITED STATES PATENTS

| | | |
|---|---|---|
| 1,861,755 | 6/1932 | Rasmussen............................285/113 |
| 1,928,570 | 9/1933 | Mustico..............................285/373 X |
| 2,346,859 | 4/1944 | Mills....................................24/249 PC |
| 2,872,141 | 2/1959 | Hefner........................................248/62 |
| 3,019,502 | 2/1962 | Walker...............................24/263 RB |
| 1,508,026 | 9/1924 | Noble...............................285/DIG. 7 |

*Primary Examiner*—Chancellor E. Harris
*Attorney*—Brooks, Haidt & Haffner

[57] ABSTRACT

A clamp or stopper for suspending a cable being laid which comprises a generally cylindrical inner clamp having frustoconical interior grooves receiving resilient rings for engaging the cable surface and an outer housing for receiving and holding the clamp and for attachment to a suspending rope or ropes.

8 Claims, 2 Drawing Figures

PATENTED JUN 27 1972 3,672,613

INVENTOR
AGOSTINO ORIANI
BY Ward, McElhannon,
Brooks + Fitzpatrick
ATTORNEYS

DISTRIBUTING CLAMPING STRESS DEVICE FOR CABLE LAYING

The present invention relates to a device known in the art as a stopper for distributing uniformly the tie stresses exerted on submarine cables during their laying.

It is known that, when submarine cables are laid, it is necessary in some cases to tie the cable to the ship in order to release the laying capstan from tension stresses. The cable is, therefore, tied and fastened, with one or more ropes, to the ship's body. Said tying arrangement, which is of particular type, is called "stopper" in sailor's slang. It is generally constituted by a plurality of ropes or braids, or by the same strands forming the tying rope, which are helically wound about the cable in order to distribute the tie stresses, which are to be transferred from the cable to the rope, along a cable length as long as possible.

With telephone cables, which are nearly always of strong construction, any kind of stopper of the above-described type proves to be appropriate. On the other hand, for power cables, which are provided with an insulation which must be handled with care, the conventional stoppers are not always suitable, as they are unable to ensure a safe and uniform distribution of the stresses acting on the cable in its gripped portion.

The present invention aims at providing a stopper, which is easy to fit on the cable, which has a strong structure and which is able to distribute in a nearly uniform way the tie stresses exerted on the cable surface and to reduce as much as possible the shear stresses.

More precisely, the object of the invention is a stopper able to distribute in a sufficiently uniform way the tie stresses exerted on submarine cables during their laying, which comprises a container, preferably of elongated shape, which encloses a clamp having a saw-toothed longitudinal inner profile of circular cross section, the diameter of the surface of a theoretical cylinder defined by the points of the teeth being greater than the diameter of the cable to be housed, and each saw-tooth comprising at least a frusto-conical portion and a cylindrical portion at the base of said frusto-conical section in order to form a groove for receiving an elastic annular element able to surround, under pressure, the cable received therein, said clamp and said container each being formed of two halves assembled together, and securing means for holding the container halves together.

Figure 2:
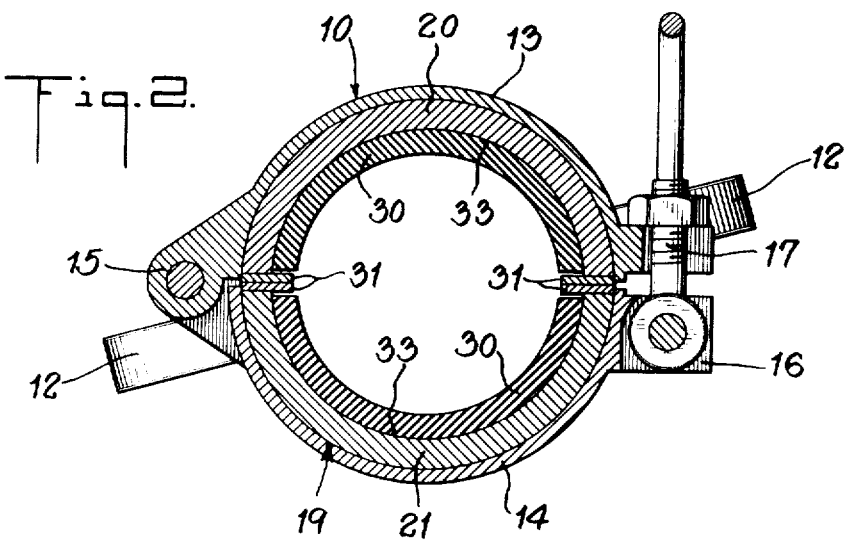

The figures of the attached sheet of drawing represent by way of example a presently preferred embodiment of the invention, in which drawing:

FIG. 1 is a side elevation view, partially in section, of a preferred embodiment of the stopper according to the invention; and FIG. 2 is a cross section, taken along line 2—2 indicated in FIG. 1.

The stopper illustrated in FIG. 1 comprises a cylindrical container 10 which is provided, externally and at its end 11, which is directed towards the anchoring rope, with a pair of diametrically opposite ears 12 (see FIG. 2), each of which is to be connected to a means, generally a rope, which must be connected in turn to the anchoring rope.

The cylindrical container 10 is constituted by two shells or halves 13, 14 connected to each other by means of a hinge 15 disposed along the length of the halves 13,14 at the line of contact therebetween.

The shells 13,14 can be locked in closed position by brackets 16 and screws 17, spaced apart along the line 18, which is diametrically opposite to that of the hinge 15.

The cylindrical container 10, constituted by the two shells 13,14 surrounds a clamp 19 which is also made of two halves 20,21. Each of these halves is retained by means of appropriate screws 22,23 (for half 20) to the corresponding shell of the container 10.

At any cross section perpendicular to its axis, the clamp 19 is circular. Its longitudinal profile 25, as defined by a longitudinal section, is saw-toothed. The diameter of the surface of a theoretical cylinder defined by the points 32, defining the smallest diameter of the clamp 19, is greater than the diameter of the cable to be received and held by the stopper.

The clamp 19 is provided, on its face directed inwardly with equidistant spaced grooves 24. The inclined portion 26 of each groove 24 constitutes a frusto-conical rotation surface, while the portion 27 adjacent to the larger portion or base 33 of the truncated cone, constitutes a cylindrical surface defining a seat 29 which encases a rubber ring 30, so that the clamp 19 is provided with a plurality of rubber rings 30, one for each saw tooth of the profile, or more precisely for each corresponding groove 29.

The rubber rings 30, like the container 10 and the clmap 19, are made of two portions or halves, in order to permit the stopper to open. Four flat plates 31, two for each set of half-cylinders, retain the ring halves in their seats 29 when the stopper is opened.

The insertion of the stopper on the cable is carried out with the stopper in opened position and at the desired point of the cable. After the insertion of the stopper on the cable, the winged nuts on the screws 17 are locked so that the cylinders, the clamp and the container form a single cylindrical body.

The cable surface comes therefore into contact with the surface of the rings 30 and the latter are slightly forced against the cable surface, since their inner diameter is chosen of such a size that they grip the cable surface, that is, the inner surface of the ring formed by each annular element 30 constituted by two half rings has a diameter at least as small as, or smaller than, the outer diameter of the cable.

Thereafter, the anchoring rope is connected to the stopper with appropriate tying ropes or analogous means, not illustrated.

When the submarine cable is laid, and the anchoring rope is therefore under stretch, the cable travels inside the stopper in the direction of the arrow F. The rubber rings 30 also tend to move in the direction of the arrow F, rolling on the surface of the cable and, at the same time, on the inclined surface 26, towards the narrower portion of the truncated cone, increasing the compression of the rings 30.

In this way, said rubber rings 30 are braked in their rolling and provide axial resistance to the movement of the cable. The pressure on the cable is uniformly distributed along all the points contacted by the annular elements 30, so that the cable — in particular, power cables, the insulation of which can be easily damaged — is prevented from suffering any undesired wearing action.

What is claimed is:

1. A clamping device for receiving and holding a cable, said device comprising an open-ended tube having at least two parts separable from each other along lines extending axially of said tube and having a plurality of peripheral grooves on the interior wall thereof, each groove having, in cross-section, an inwardly inclined surface, means for holding said parts of said tube together, and a plurality of rings of resilient material, one mounted in each groove, with the exterior periphery thereof engaged by the wall of the corresponding groove, the smallest inner peripheral portion of said tube being greater than the exterior periphery of the cable to be received thereby, the inner periphery of said rings being at least substantially as small as said exterior periphery of said cable and being smaller than said smallest inner peripheral portion of said tube and the maximum inner peripheral wall dimension of the ring engaging portion of said grooves being less than the exterior peripheral dimension of said rings for applying radial pressure to said rings and for thereby compressing said rings between said tube and said cable in all relative positions of said cable and said tube.

2. A clamping device as set forth in claim 1 wherein each groove comprises a frusto-conical surface and a cylindrical surface adjoining the larger diameter end of said frusto-conical surface, the dimension of the circumference of said cylindrical surface being less than the exterior peripheral dimension of said rings.

3. A clamping device as set forth in claim 2 wherein each ring is toroidal.

4. A clamping device as set forth in claim 1 wherein said tube is generally cylindrical and comprises two semi-cylindrical halves, and said rings are each formed of two substantially semi-circular halves.

5. A clamping device as set forth in claim 4 wherein said rings are made of rubber.

6. A clamping device as set forth in claim 4 further comprising means for retaining said semi-circular ring halves within said grooves when said semi-cylindrical tube halves are separated.

7. A clamping device as set forth in claim 9 further comprising means at the end of said housing at the side of said grooves having the largest peripheral dimension for suspending said housing.

8. A clamping device for receiving and holding a cable, said device comprising an open-ended, generally cylindrical tube having two semi-cylindrical halves separable from each other along lines extending axially of said tube and having a plurality of peripheral grooves on the interior wall thereof, each groove having, in cross-section, an inwardly inclined surface, means for holding said parts of said tube together, comprising a housing having two halves for receiving said tube halves, said housing halves being hinged together at one side thereof along a hinge line substantially parallel to the axis of said tube, and means at the opposite side of said housing halves for holding them together, and a plurality of rings of resilient material, each ring being formed of two substantially semi-circular halves and one ring being mounted in each groove, with the exterior periphery thereof engaged by the wall of the corresponding groove, the smallest inner peripheral portion of said tube being greater than the exterior periphery of the cable to be received thereby, the inner periphery of said rings being at least substantially as small as said exterior periphery of said cable and the maximum inner peripheral wall dimension of the ring engaging portion of said grooves being less than the exterior peripheral dimension of said rings for applying radial pressure to said rings and for thereby compressing said rings between said tube and said cable in all relative positions of said cable and said tube.

* * * * *

UNITED STATES PATENT OFFICE
CERTIFICATE OF CORRECTION

PO-1050
(5/69)

Patent No. 3,672,613         Dated    June 27, 1972

Inventor(s)    Agostino Oriani

It is certified that error appears in the above-identified patent and that said Letters Patent are hereby corrected as shown below:

Column 3, claim 7, line 1, replace "9" by --8--

Signed and sealed this 24th day of October 1972.

(SEAL)
Attest:

EDWARD M. FLETCHER, JR.
Attesting Officer

ROBERT GOTTSCHALK
Commissioner of Patents